June 5, 1934.  E. S. MASON  1,961,566
DIVIDING OR FORMING DEVICE FOR PLASTIC MATERIALS
Filed March 7, 1932   2 Sheets-Sheet 1
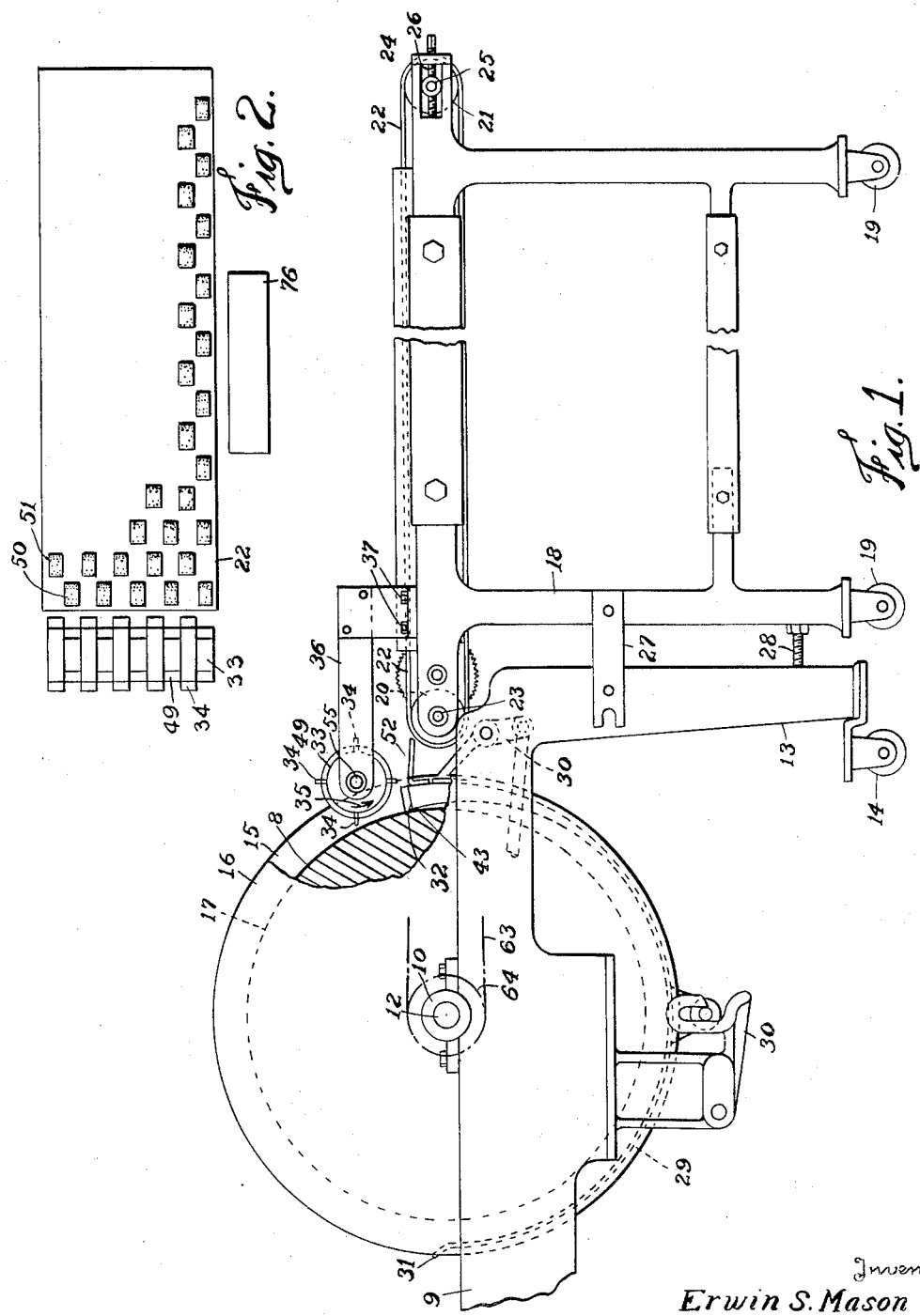
Inventor
Erwin S. Mason
By Murray and Zugelter
Attorneys June 5, 1934. E. S. MASON 1,961,566
DIVIDING OR FORMING DEVICE FOR PLASTIC MATERIALS
Filed March 7, 1932 2 Sheets-Sheet 2
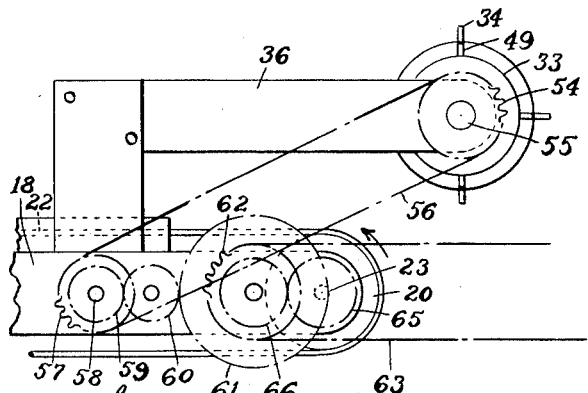
Fig. 3.
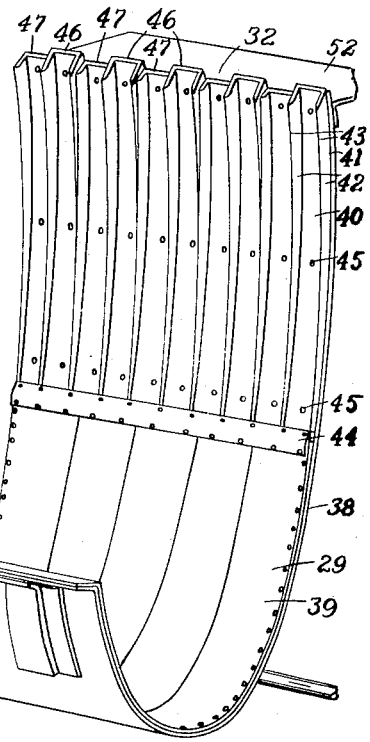
Fig. 4.
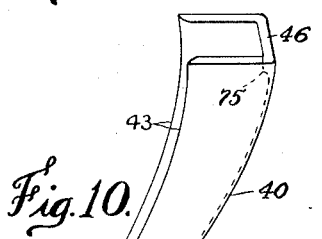
Fig. 10.
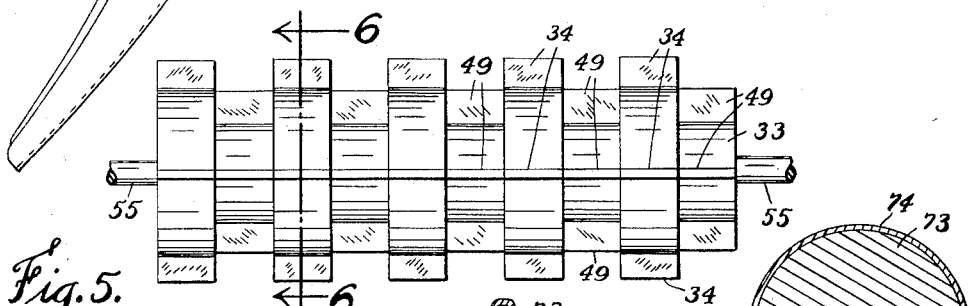
Fig. 5.
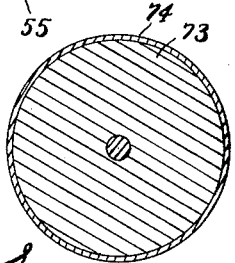
Fig. 8.
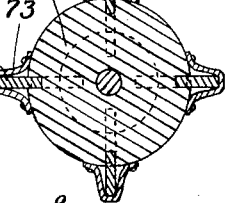
Fig. 7.
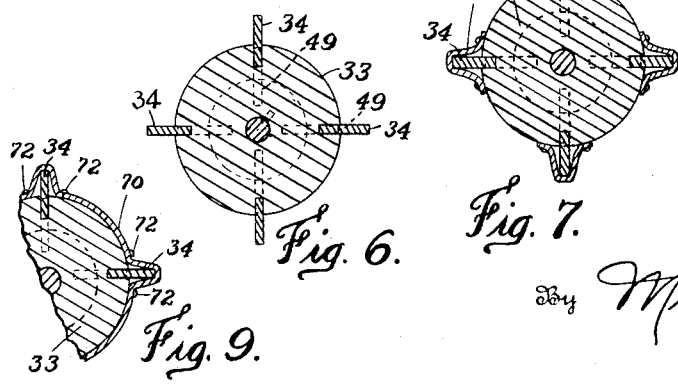
Fig. 6.
Fig. 9.
Inventor
Erwin S. Mason
By Murray and Zugelter
Attorneys Patented June 5, 1934

UNITED STATES PATENT OFFICE 1,961,566

DIVIDING OR FORMING DEVICE FOR PLASTIC MATERIALS

Erwin S. Mason, Norwood, Ohio, assignor to The J. H. Day Company, Cincinnati, Ohio, a corporation of Ohio Application March 7, 1932, Serial No. 597,218

21 Claims. (Cl. 107—9)

This invention relates to a biscuit, bun, or loaf forming machine.

An object of the invention is to provide a dividing or forming machine which automatically will form biscuits, buns, or other shaped loaves of dough or plastic material with great speed and uniformity of size and weight, at a low cost of operation.

Another object of the invention is to provide a loaf, biscuit, or bun forming machine provided with means whereby biscuits or buns formed therein are completely separated and discharged in a staggered or offset relationship, so that they may conveniently be removed and placed in pans.

Another object of the invention is to provide simple and inexpensive means whereby the foregoing operation may be accomplished.

A further object is to provide a novel take-off element and cooperative multi-ribbed pressure board for machines of the character above referred to.

These and other objects are attained by the means described herein and disclosed in the accompanying drawings, in which:

Fig. 1 is an elevational view of the device, parts thereof being broken away.

Fig. 2 is a top view, diagrammatical in nature, showing how the buns or biscuits are discharged by the take-off mechanism in a staggered, completely separated relationship.

Fig. 3 is an enlarged fragmental view showing a driving mechanism for the take-off element, which mechanism is disposed on the side of the machine opposite to that shown in Fig. 1.

Fig. 4 is an isometric view of an improved multi-ribbed pressure board of the invention.

Fig. 5 is a detail view showing in plan the improved take-off element or roll which cooperates with the pressure board.

Fig. 6 is a cross-sectional view taken on line 6—6 of Fig. 5.

Figs. 7, 8 and 9 are views similar to that of Fig. 6, each showing a modified form of take-off element.

Fig. 10 is an enlarged isometric view of one of the channel elements constituting the pressure board.

Referring to Fig. 1 of the drawings, 8 indicates the rotating drum of a loaf molder, which drum is power actuated in the customary manner and is supported upon a molder frame 9 by means of opposed bearings 10 which receive the central shaft 12 of the drum. The frame 9 is provided with the usual uprights or legs 13 which, if desired, may be supported upon casters 14. The drum 8 includes the spaced flanges 15 and 16 which define the molding surface 17 of the drum.

The character 18 indicates a conveyor frame, which may also be mounted upon casters 19, if desired, said frame being adapted to provide a support for the conveyor rolls 20 and 21 over which passes the endless conveyor belt 22. The axles of the conveyor rolls are indicated at 23 and 24, axle 24 being preferably associated with a bearing 25 adjustable longitudinally of the frame by means of the adjustment screw 26. Means are provided for coupling the conveyor frame 18 to the frame 13 of the molder, and said means conveniently may comprise a coupling bar 27 and a binder or adjusting screw 28. The multi-ribbed pressure board 29, which is shown in detail in Fig. 4, is supported between the flanges 15 and 16 of the molder drum, in predetermined spaced relationship with the molding surface 17 of the drum. Any suitable well-known means may be utilized for supporting the pressure board, there being one of such means disclosed conventionally at 30 of Fig. 1. It is to be understood that dough is fed to the molder at the location 31, and discharged therefrom at the opposite end of the pressure board indicated at 32. At the said opposite or discharge end is disposed the take-off element 33, which may be in the form of a roll provided with radially extending cleats or paddles 34 which are peculiarly arranged on the roll. The take-off device is provided with suitable means for rotation thereof in the direction indicated by the arrow 35.

In the preferred form of the device, the take-off device is supported in proper relationship with the molder drum and the pressure board, by being mounted upon a pair of spaced extending brackets 36 mounted upon the conveyor frame 18 in any suitable manner, such as by means of the bolts 37.

The pressure board, which is indicated generally at 29, may comprise a substantially semi-cylindrical sheet 38 of metal or other suitable substance, approximately two-thirds of which may have its interior surface coated or covered with a sheet or strips 39 of canvas or other suitable lining material. The remaining portion of the pressure board is provided with the multi-ribbed structure indicated generally at 40, wherein the elongated loaf-like masses of dough formed by the portion 29 are divided into a series of separated buns, biscuits, or smaller loaves. The multi-ribbed portion is constituted of a series of channel shaped members 41 having extending legs 42 which taper to a reduced width in the region of the smooth portion 29 of the pressure board. At the discharge end 32 of the pressure board, the legs 42 are of maximum width, and it is here that they substantially contact the molding surface 17 of the molder drum. It will be noted that the free edges of the legs 42 are ground or otherwise shaped to provide knife edges 43 which cut and separate the elongated mass into short lengths, or buns or biscuits. The character 44 indicates a transverse strip of leather or other suitable material which provides a smooth joint at the junction of the channels and the lining material 39.

The multi-ribbed section of the pressure board may be constituted of a series of parallel channel members 40, which may individually be riveted or otherwise secured to the plate 38, as at 45, or said multi-ribbed section may be cast or stamped in one piece. It will be noted that the outer ends 46 of alternate channel members extend upwardly a distance slightly greater than the upper edges 47 of the intervening channel members. This construction actually separates the pieces immediately on passing through the knives by raising alternate pieces higher than the others. This construction also provides for movement of the outermost cleats or paddles 34 between alternate channels 46, while the innermost cleats or paddles 49 move in close proximity with the extending edges 46 of the intervening channel members.

It should be evident from the foregoing, that the short loaves, biscuits, or buns ejected from the edges 47 of the shorter channels by means of the long paddles or cleats 34, will be impelled with more force and to a greater distance than will the biscuits or buns impelled from the longer channels by the shorter paddles or cleats 49. Therefore, the action of the long and short paddles or cleats can be depicted by a view such as Fig. 2, wherein 50 and 51 represent the buns, loaves, or biscuits ejected by the short and long cleats, respectively. It is further evident that the particles 50 and 51 are thereby completely separated from each other and may most conveniently be picked from the conveyor by an operator and placed in pans, because they are spaced apart considerably. At 52 is indicated an apron or the like which affords a surface over which the ejected biscuits may move to reach the conveyor 22. The apron may be fixed to the pressure board 38.

By referring to Fig. 4, it will be observed that the sharpened inwardly extending edges 43 of the long channels do not coincide with those of the short channels but are disposed beyond them. In this manner there is attained the advantage of having at the cutting edge a single thickness of metal which provides for effectively dividing the plastic masses into buns or biscuits. The cutting edges 43, in the region of the upper ends of the channel members, lie in close proximity with the working face 17.

Although any suitable means may be provided for rotating the take-off element 33, there is shown by way of example a drive means comprising a sprocket 54 fixed on the shaft 55 of the take-off element, and a chain 56 passing over this sprocket and over a sprocket 57 rotatably mounted upon a shaft 58. A gear 59 mounted for rotation with sprocket 57 engages an idler gear 60 which in turn engages a gear 61 that is mounted for rotation with a main driving sprocket 62. The main driving sprocket is rotated by means of a chain 63 passing over a sprocket 64 which rotates with the molder drum 8 (see Fig. 1).

The conveyor 22 may be driven by means of a gear 65 on the conveyor shaft 23, which gear meshes with a gear 66 that rotates with sprocket 62.

The device of the invention may operate at a high speed and the biscuits or buns which are discharged by the take-off device are always completely separated and spaced apart when they reach the conveyor 22, thereby facilitating their removal from the conveyor and the transferring thereof into pans. By removing the take-off element 33 and properly adjusting the pressure board, the machine may be used to make ordinary elongated loaves or rolls. The distance between adjacent knife edges of the channel members determines the size of bun, biscuit, or loaf that will be discharged from the machine.

In accordance with Fig. 9 of the drawings, the cleats or paddles are covered by and included within the confines of endless belts of canvas, duck or other suitable fabric material. It is evident from Fig. 9 that each set of long paddles 34 is included within the confines of an endless belt 70 which contacts the outer ends of the paddles; and each set of the shorter cleats or paddles may be likewise surrounded by a similar but shorter belt. The belts preferably are of substantially the same width as the paddles, and may be secured to the body member 33 closely adjacent to the paddles. At 72 are indicated screws or the like which pass through the belt 70 and secure it to the body member 33 adjacent to the paddle or cleat 34, thus precluding shifting of the belt from its position on the paddle end. In accordance with Fig. 7, short lengths 73 of fabric material are employed instead of endless belts of such material, to provide the friction covering for the paddles, and to assist in maintaining them in position should they become loosened.

The take-off element 73, illustrated in Fig. 8, is a plain cylinder of proper length adapted to replace the take-off element 33. Element 73 may be used when it is desired to discharge the divided buns, biscuits, or small loaves in a substantial side-by-side relationship, or when a pressure board 29 without channel elements 40 is employed. The take-off element 73 if desired, may be provided with a covering 74 of canvas, duck, or other suitable gripping material which provides for frictional engagement with the dough loaves.

As indicated in Fig. 9, each channel element 40 may be provided at its upper edge 46 with an interiorly disposed hump or transverse rib 75. The purpose of said hump or rib is to provide an obstruction which the dough mass about to be discharged can pass, because of its positive advancement by the molder drum, but which obstruction precludes said mass from falling back into the channels while awaiting contact with the paddles or cleats.

In panning the discharged loaves or masses 50—51, (Fig. 2), the masses preferably are removed sidewise of the conveyor 22 and placed in the pan 76 in the same relative positions at which they rested while on the conveyor; that is, an operator who pans the masses or dough lumps selects the desired number of lumps from a longitudinal row of lumps, rather than from a transverse row, and places them in the pan in the same relationship in which they rested upon the conveyor. By this manner of panning, the grain of the lumps is caused to extend in a common transverse direction, with the result that the lumps, after baking, may more readily be broken apart; and when sliced in the usual manner (longitudinally of the finished bun or roll) the grain is found to extend transversely of the bun or roll, which facilitates buttering or spreading of cheese and the like over the cut surface.

It is understood that various modifications and changes in structural details of the device may be made, within the scope of the appended claims, without departing from the spirit of the invention.

What is claimed is:

1. The combination of a rotating loaf molding drum having a curved working surface, a curved multi-ribbed pressure board disposed about part of the working surface in spaced relation whereby plastic masses are formed into elongated cylindrical loaves and divided into short lengths, and means for discharging some of the short lengths prior to the discharge of the others.

2. The combination of a rotating loaf molding drum having a curved working surface, a curved multi-ribbed pressure board disposed about part of the working surface in spaced relation whereby plastic masses are formed into elongated cylindrical loaves and divided into short lengths, and moving members operating in close proximity with the pressure board for striking the divided short lengths of plastic material with different degrees of force while ejecting them from the machine.

3. The combination of a rotating loaf molding drum having a curved working surface, a curved multi-ribbed pressure board disposed about part of the working surface in spaced relation whereby plastic masses are formed into elongated cylindrical loaves and divided into short lengths, and means including a driven take-off element having long and short extensions thereon adapted to move in close proximity to the pressure board and to strike the divided short lengths of plastic material with different degrees of force while ejecting them from the machine.

4. The combination of a rotating loaf molding drum having a curved working surface, a curved multi-ribbed pressure board disposed about part of the working surface in spaced relation whereby plastic masses are formed into elongated cylindrical loaves and divided into short lengths, the pressure board having between its ribs alternate extending and receding end edges, and a driven take-off element including alternate long and short radial extensions movable past and in close proximity with said receding and extending end edges, respectively, for striking and forcibly advancing the divided short lengths of plastic material away from the pressure board.

5. A multi-ribbed pressure board for dividing elongated cylindrical lengths of plastic material into short lengths, said board comprising a rearward section provided with spaced ribs extending in a common direction, and adjacent extended and receded end edges defined by the ribs and located at the rear end of the pressure board.

6. A pressure board for dividing elongated cylindrical lengths of plastic material into short lengths, said board comprising ends, spaced ribs on the board extending to one end thereof and increasing in height as they approach said end, said end being serrated to provide alternate extended and receded end edges between adjacent ribs.

7. The combination of a frame, a receiving conveyor supported for movement relative to the frame, bracket means extending from the frame, a drive means, and a take-off device comprising a member rotatably supported by the bracket means and having driving connection with the drive means, said rotatably supported member having members extending therefrom for impelling toward the receiving conveyor particles of divided plastic material from a molder.

8. The combination of a frame, a receiving conveyor supported for movement relative to the frame, bracket means extending from the frame, a drive means, and a take-off device comprising a member rotatably supported by the bracket means and having driving connection with the drive means, said rotatably supported member having members extending therefrom at different distances from the axis of rotation of the rotatably supported member for impelling toward the receiving conveyor particles of divided plastic material from a molder.

9. The combination of a frame, a receiving conveyor supported for movement relative to the frame, bracket means extending from the frame, a drive means, and a take-off device comprising a member rotatably supported by the bracket means and having driving connection with the drive means, said rotatably supported member having alternately long and short stroke members extending therefrom for impelling toward the receiving conveyor particles of divided plastic material from a molder.

10. The combination of a rotating loaf molding drum having a curved working surface, a curved multi-ribbed pressure board disposed about a part of the working surface in spaced relation whereby elongated plastic masses are formed into small substantially uniform lumps, and a serrated discharge edge disposed at one extremity of the pressure board to effect a staggered disposition of the uniform lumps and from which edges lumps may leave in a staggered relationship.

11. The combination of a rotating loaf molding drum having a curved working surface, a curved pressure board having channel members some of which extend beyond the ends of others, and each being extended about a part of the working surface in spaced relation whereby elongated plastic masses are rolled and divided into lengths, and power actuated means for contacting the divided lengths and positively removing them from the loaf molding drum.

12. As a new article of manufacture a pressure board for dough working machinery, said pressure board having a section provided with parallel longitudinal channel members some of which extend beyond the ends of others.

13. As a new article of manufacture a pressure board for dough working machinery, said pressure board having a section provided with parallel longitudinal ribs, and hump-like protuberances between adjacent ribs in the region of their ends.

14. A multi-ribbed pressure board for dividing elongated cylindrical lengths of plastic material into short lengths, said board comprising a section provided with spaced ribs extending in a common direction, adjacent extended and receded end edges intermediate the ribs and located at one end of the pressure board, and hump-like protuberances intermediate adjacent ribs in the region of their ends and in proximity with the said extended and receded end edges.

15. The combination of a loaf advancing and molding member having a working surface, a multi-ribbed pressure board disposed in spaced relationship with said working surface whereby plastic masses are formed into elongated cylindrical loaves and divided into short lengths, and means for discharging some of the short lengths prior to the discharge of others.

16. The combination of a loaf advancing and molding member having a working surface, a multi-ribbed pressure board disposed in spaced relationship with said working surface whereby plastic masses are formed into elongated cylindrical loaves and divided into short lengths, a rear terminal edge on the pressure board, and means located at said edge for discharge of some of the short lengths prior to discharge of others, after the dividing operation.

17. The combination with a machine including a pair of cooperative working surfaces movable relatively to roll and advance an elongated cylindrical mass of plastic material to a discharging position, of means for substantially dividing the elongated cylindrical mass into short lengths, and moving members operating in close proximity to the discharging position for striking the divided short lengths of plastic material with different degrees of force while ejecting them from the machine.

18. The combination with a machine including a pair of cooperative pressing faces movable relatively to roll and advance an elongated cylindrical mass of plastic material to a discharging position, of means for substantially dividing the elongated cylindrical mass into short lengths, and means including a driven take-off element having long and short extensions thereon adapted to move in close proximity to one of the pressing faces for striking the divided short lengths of plastic material with different degrees of force while ejecting them from the machine.

19. In the art of dough-working, the method which comprises advancing and rolling a dough mass into solid elongated cylindrical shape, then dividing the solid cylindrical mass to produce short lengths without materially affecting the rate of advancement of the dough, then striking some of the individual short lengths of dough with greater force than others, to impel them different distances along a surface.

20. In the art of dough-working, the method which comprises advancing and rolling a dough mass into solid elongated cylindrical shape, and simultaneously dividing the solid cylindrical mass to produce short lengths without materially affecting the rate of advancement of the dough, then striking some of the individual short lengths of dough with greater force than others, to impel them different distances along a surface.

21. In the art of dough-working, the method which comprises advancing and rolling a dough mass into solid elongated cylindrical shape, then substantially dividing the solid cylindrical mass to produce short lengths without materially affecting the rate of advancement of the dough, then striking alternate ones of the axially aligned individual short lengths of dough at different times to discharge them in staggered relationship.

ERWIN S. MASON.